(12) United States Patent
Yoshida et al.

(10) Patent No.: US 12,257,647 B2
(45) Date of Patent: Mar. 25, 2025

(54) JOINING METHOD

(71) Applicant: NIPPON LIGHT METAL COMPANY, LTD., Tokyo (JP)

(72) Inventors: Ryo Yoshida, Shizuoka (JP); Hiroshi Kaneki, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 17/788,660

(22) PCT Filed: Dec. 2, 2020

(86) PCT No.: PCT/JP2020/044890
§ 371 (c)(1),
(2) Date: Jun. 23, 2022

(87) PCT Pub. No.: WO2021/131561
PCT Pub. Date: Jul. 1, 2021

(65) Prior Publication Data
US 2023/0044246 A1    Feb. 9, 2023

(30) Foreign Application Priority Data

Dec. 25, 2019  (JP) .................................. 2019-234529

(51) Int. Cl.
*B23K 26/00*    (2014.01)
*B23K 26/24*    (2014.01)
*B23K 26/323*   (2014.01)

(52) U.S. Cl.
CPC ................................. *B23K 26/323* (2015.10)

(58) Field of Classification Search
CPC ......... B23K 26/00; B23K 26/14; B23K 28/02
See application file for complete search history.

(56) References Cited

U.S. PATENT DOCUMENTS

| | | | |
|---|---|---|---|
| 8,546,720 B2 * | 10/2013 | Lin | B23K 28/02 |
| | | | 219/121.64 |
| 9,440,314 B2 * | 9/2016 | Devers | B23K 26/348 |

(Continued)

FOREIGN PATENT DOCUMENTS

| | | |
|---|---|---|
| CN | 103056533 A | 4/2013 |
| CN | 109202287 A | 1/2019 |

(Continued)

OTHER PUBLICATIONS

International Search Report for PCT/JP2020/044890 (Jan. 19, 2021).

(Continued)

*Primary Examiner* — Steven W Crabb
*Assistant Examiner* — Lawrence H Samuels
(74) *Attorney, Agent, or Firm* — Merchant & Gould P.C.

(57) ABSTRACT

A joining method includes: an overlapping step of overlapping a front surface of a first metal member with a back surface of a second metal member; and a welding step of welding the first metal member with the second metal member by hybrid welding, with use of a hybrid welding machine including a leading laser welding unit and a trailing arc welding unit. In the welding step, laser welding, by irradiating a laser beam, and arc welding are performed, along a preset travel route set on an inner corner portion formed by the front surface of the first metal member and an end surface of the second metal member, to the inner corner portion and the laser beam is oscillated to cross the preset travel route.

4 Claims, 12 Drawing Sheets

(56) References Cited

U.S. PATENT DOCUMENTS

| | | | | |
|---|---|---|---|---|
| 2009/0017328 | A1* | 1/2009 | Katoh | B23K 35/406 |
| | | | | 428/653 |
| 2012/0006795 | A1* | 1/2012 | Nowak | B23K 26/0604 |
| | | | | 219/121.64 |
| 2014/0054273 | A1* | 2/2014 | Behmlander | B23K 28/02 |
| | | | | 219/136 |
| 2014/0124486 | A1* | 5/2014 | Devers | B23K 9/32 |
| | | | | 219/121.45 |
| 2014/0124489 | A1* | 5/2014 | Zhang | B23K 26/348 |
| | | | | 219/137 R |
| 2016/0001403 | A1* | 1/2016 | Matsumoto | C22C 21/16 |
| | | | | 219/137 R |
| 2018/0257160 | A1* | 9/2018 | Tatsumi | B23K 26/242 |
| 2018/0361507 | A1* | 12/2018 | Hioki | B23K 26/242 |
| 2019/0299333 | A1* | 10/2019 | Kokume | B23K 26/26 |
| 2022/0152735 | A1* | 5/2022 | Zhang | B23K 26/0876 |

FOREIGN PATENT DOCUMENTS

| | | | |
|---|---|---|---|
| JP | 2001-246485 A | 9/2001 | |
| JP | 2001-276969 A | 10/2001 | |
| JP | 2002-066774 A | 3/2002 | |
| JP | 2003-001454 A | 1/2003 | |
| JP | 2007-090397 A | 4/2007 | |
| JP | 2016-030289 A | 3/2016 | |
| JP | 2019-123008 A | 7/2019 | |
| WO | WO-2020180871 A1 * | 9/2020 | ......... B23K 26/0622 |

OTHER PUBLICATIONS

Office Action for Chinese Patent Application No. 202080089792.8 (Jun. 5, 2023).

Chinese Office Action issued in Chinese Patent Application No. 202080089792.8 dated Nov. 15, 2023.

\* cited by examiner

FIG. 8

| WELDING METHOD | WELDING CONDITION ||||||||||
| --- | --- | --- | --- | --- | --- | --- | --- | --- | --- | --- |
| | ARC WELDING || LASER WELDING | WELDING SPEED [m/min] | TRAVEL ANGLE [deg] || WORK ANGLE [deg] || LASER OSCILLATION AMPLITUDE [mm] | LASER FREQUENCY [Hz] |
| | WELDING CURRENT [A] | WELDING VOLTAGE [%] | LASER POWER [kW] | | LASER ($\theta 1$) | ARC ($\theta 2$) | LASER ($\theta 3$) | ARC ($\theta 4$) | | |
| COMPARATIVE EXAMPLE | 228 | −5 | 2.5 | 5.0 | 10 | 30 | 45 || — | — |
| WORKING EXAMPLE | 230 | −12 | 4.5 | 5.0 | 10 | 30 | 45 | 45 | 3.2 | 335 |

JOINING METHOD

This application is a National Stage Application of PCT/JP2020/044890, filed Dec. 2, 2020, which claims benefit of priority to Application No. 2019-234529, filed Dec. 25, 2019 in Japan, and which applications are incorporated herein by reference. To the extent appropriate, a claim of priority is made to each of the above disclosed applications.

TECHNICAL FIELD

The present invention relates to a joining method.

BACKGROUND ART

Arc welding, laser welding, hybrid welding, and the like have been known as methods for forming a lap joint by welding an inner corner portion formed by metal members overlapped with each other. Arc welding is performed with a filler material being supplied, to have an advantage that wider margins are secured for a gap between welded parts or misalignment of a welded position. Meanwhile, arc welding has disadvantages that a welding speed is slow, and a penetration depth is small. In arc welding, if a welding speed is set high, an amount of weld metal (throat thickness) of the inner corner portion becomes short to incur a disadvantage that joint strength is decreased.

Laser welding has an advantage that a welding speed can be increased than that of arc welding. Meanwhile, in laser welding, no filler material is added, to have a disadvantage that margins for a gap between welded parts and misalignment of a welded position are significantly small.

In hybrid welding, a hybrid welding machine is used that includes a leading laser welding unit and a trailing arc welding unit (see Patent Literature 1). FIG. 13 is a schematic cross-sectional view of a scene of conventional hybrid welding. In the hybrid welding, an inner corner portion U formed by a front surface 1b of a first metal member 1 and an end surface 2a of a second metal member 2 is welded. In the hybrid welding, welded positions with a leading laser beam LB and a trailing MIG arc 33 are both set to a corner P where the front surface 1b of the first metal member 1 intersects with the end surface 2a of the second metal member 2.

CITATION LIST

Patent Literature 1: Japanese Patent Application Publication No. 2016-30289

SUMMARY OF INVENTION

Problem to be Solved

With the hybrid welding described above, disadvantages of the laser welding and the arc welding can be compensated to perform welding. However, hybrid welding still has the phenomenon that, if a welding speed is set high, an amount of the weld metal (throat thickness) becomes short at the inner corner portion, to have problems of joint strength decreased at the lap joint and robustness to allowance for a gap or misalignment of a welded position decreased. Recently, a weld length has been increased with an object to be welded increasing in size, and therefore an increase in welding speed and an increase in robustness are desired.

In view of the above, the present invention is intended to provide a joining method which can achieve increasing welding speed and improving robustness to allowance for a gap between metal members or misalignment of a welded position.

Solution to Problem

To solve the problem described above, the present invention provides a joining method including an overlapping step of overlapping a front surface of a first metal member with a back surface of a second metal member; and a welding step of welding the first metal member with the second metal member by hybrid welding, with use of a hybrid welding machine including a leading laser welding unit and a trailing arc welding unit, wherein, in the welding step, laser welding, by irradiating with a laser beam, and arc welding are performed, along a preset travel route which is set on an inner corner portion formed by the front surface of the first metal member and an end surface of the second metal member, to the inner corner portion and the laser beam is oscillated to cross the preset travel route.

According to the joining method, the laser beam is oscillated so that a penetration width can be increased, and an amount of weld metal (throat thickness) can be increased at the inner corner portion. This can achieve both increasing welding speed and improving joint strength. Further, an amount of the weld metal (throat thickness) can be increased so that the robustness to allowance for a gap between metal members or misalignment of the welded position can be improved.

Further, the gap between the first metal member and second metal member is preferably set in a range of 0-1 mm.

Still further, the preset travel route is preferably set in a range of −0.5 to 1.0 mm in a direction orthogonal to the end surface with respect to a corner where the front surface of the first metal member intersects with the end surface of the second metal member, while being in parallel to the end surface of the second metal member.

Yet further, the throat thickness of the weld metal formed at the inner corner portion with the welding step is preferably in a range of 1-5 mm.

Further, the first metal member is preferably made of aluminum or an aluminum alloy, and the second metal member is preferably made of aluminum or an aluminum alloy.

According to the joining method, joining is more suitably performed.

Advantageous Effects of Invention

A joining method according to the present invention can achieve increasing welding speed and improving robustness to allowance for a gap between metal members and misalignment of a welded position.

BRIEF DESCRIPTION OF DRAWINGS

FIG. 8 is a table of welding conditions of a comparative example and a working example in a joint strength test;

DETAILED DESCRIPTION OF THE INVENTION

Figure 1:
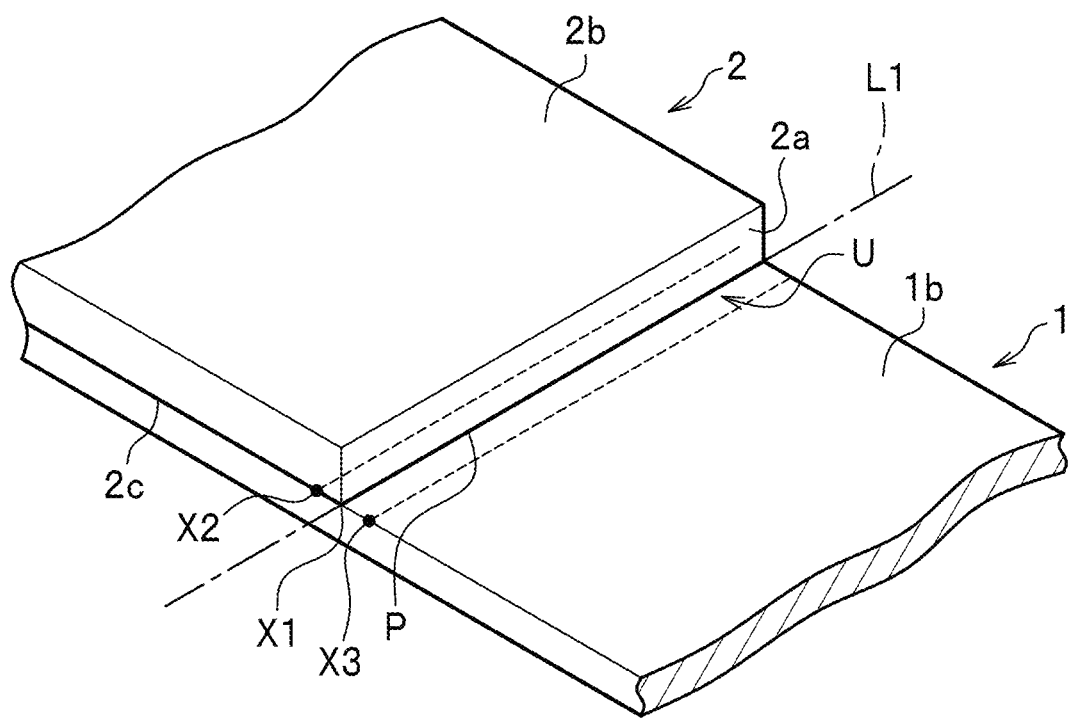
FIG. 1 is a perspective view of a scene of an overlapping step of a joining method according to an embodiment of the present invention.

A description is given in detail of a joining method according to an embodiment of the present invention, with reference to drawings. The present invention is not limited only to the embodiment described below. Further, some or all components in the embodiment may be combined as appropriate. As shown in FIG. 1, in the joining method according to the present embodiment, a second metal member 2 is overlapped, and then joined by welding, with a first metal member 1 so as to form a lap joint. The joining method according to the present embodiment includes an overlapping step and a welding step. Note that, a "front surface" in the description denotes a surface on the opposite side of a "back surface". Note that, in the description, when a numerical range is defined by a lower limit and an upper limit with a symbol "-", both the lower and upper limits are included in the range.

In the overlapping step, as shown in FIG. 1, the second metal member 2 is overlapped with the first metal member 1. The first metal member 1 and second metal member 2 may have any shape, and, in the present embodiment, both have a plate shape. The first metal member 1 and second metal member 2 are properly selected from weldable metals such as aluminum, an aluminum alloy, copper, a copper alloy, titanium, a titanium alloy, an iron steel, and a stainless steel. Of these, aluminum or an aluminum alloy is preferably used as the first metal member 1 and second metal member 2. That is, the first metal member 1 is preferably made of aluminum or an aluminum alloy. Further, the second metal member 2 is preferably made of aluminum or an aluminum alloy. In the present embodiment, a case where the first metal member 1 and second metal member 2 are made of an aluminum alloy is described.

In the overlapping step, a front surface 1b of the first metal member 1 is overlapped with a back surface 2c of the second metal member 2. The front surface 1b of the first metal member 1 and an end surface 2a of the second metal member 2 form an inner corner portion U. A "preset travel route L1" is set at the inner corner portion U as a welded position by laser welding and arc welding. More specifically, a line which is formed by the front surface 1b of the first metal member 1 and the end surface 2a of the second metal member 2 intersecting with each other is set as the "preset travel route L1". Further, a corner where the front surface 1b of the first metal member 1 intersects with the end surface 2a of the second metal member 2 is referred to as a corner P. In other words, the preset travel route L1 is set to the corner P of the inner corner portion U. Note that, in a case where there is a gap between the front surface 1b of the first metal member 1 and the back surface 2c of the second metal member 2 so that the first metal member 1 is separated from the second metal member 2, an intersection between a perpendicular line drawn down from a lower end, on the end surface 2a, of the back surface 2c of the second metal member 2 toward the front surface 1b of the first metal member 1 is referred to as the corner P.

The preset travel route L1 may be set to a position offset toward the second metal member 2 with respect to the corner P while being in parallel to the end surface 2a, or a position away from the second metal member 2 with respect to the corner P. For example, the preset travel route L1 may be set in a range of −0.5 to 1.0 mm in a direction perpendicular to the end surface 2a with respect to the corner P, while being in parallel to the end surface 2a of the second metal member 2. The preset travel route L1 is preferably set in a range of −0.5 to 0.5 mm with respect to the corner P. Note that a direction from the corner P toward the second metal member 2 is assumed to be positive and a direction away from the second metal member 2 is assumed to be negative.

Figure 2:
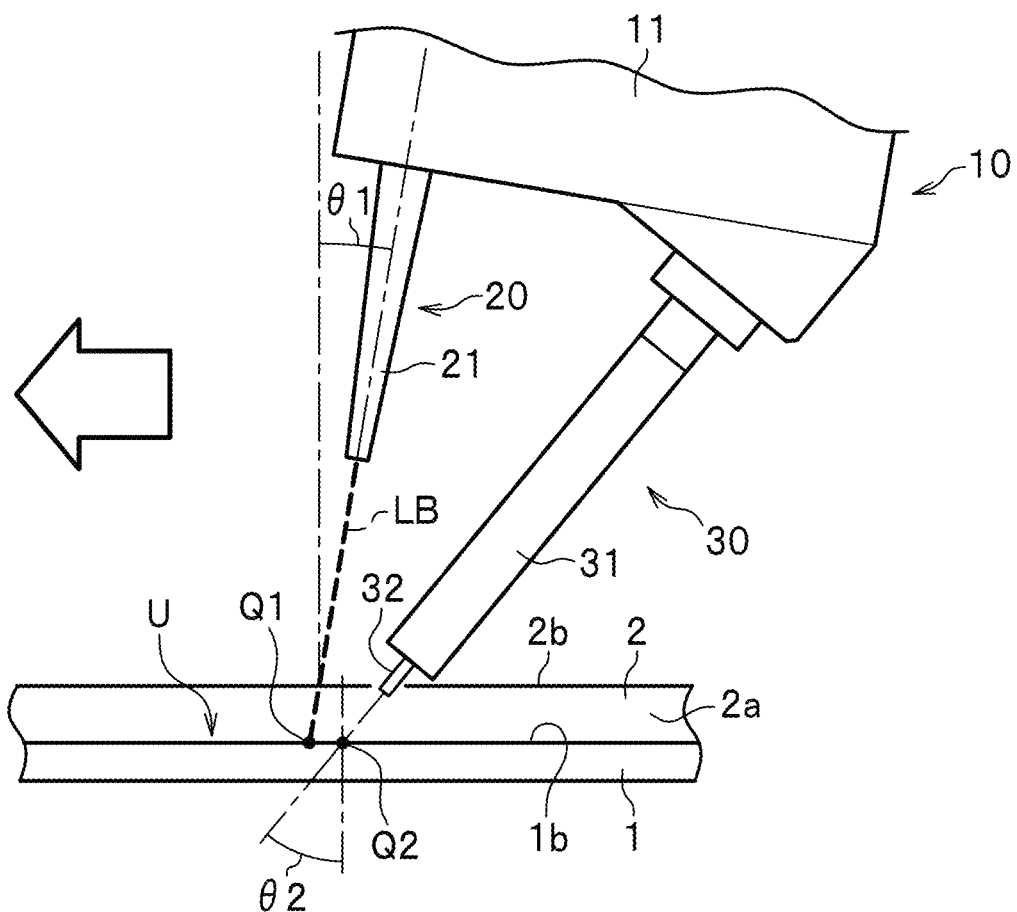
FIG. 2 is a side view of a scene of a welding step of the joining method according to the present embodiment.

In the welding step, as shown in FIG. 2, the inner corner portion U, formed by the first metal member 1 overlapped with the second metal member 2, is welded with use of a hybrid welding machine 10. In the welding step, the first metal member 1 and second metal member 2 are welded to each other by laser-arc hybrid welding using laser welding and arc welding. In FIG. 2, the hybrid welding machine 10 travels from right to left such that a laser welding unit 20 takes a lead. Note that applied arc welding includes gas shielded arc welding such as MIG welding, MAG welding, carbon dioxide gas arc welding, and TIG welding. Of these, MIG welding is preferably used for reasons that MIG welding is suitable for automation using a robot arm and less likely causes oxidation of joined members due to shielding gas. In the present embodiment, a case where MIG welding is applied as arc welding is described by way of example.

The hybrid welding machine 10 includes a connecting unit 11, the laser welding unit 20, and an arc welding unit 30. The connecting unit 11 is attached to a distal end of an arm robot, for example. The laser welding unit 20 is provided with a laser head 21 and is formed at one end of the connecting unit 11. A laser beam LB is radiated from the laser head 21. Note that MIG welding is performed as arc welding in the present embodiment as described above, so that the "arc welding unit 30" is referred to as "MIG welding unit 30" hereinbelow.

The MIG welding unit 30 includes an arc torch 31 and is formed at the other end of the connecting unit 11. The arc torch 31 supplies a filler material 32 and generates a MIG arc 33 (see FIG. 7) at a distal end thereof.

Figure 3:
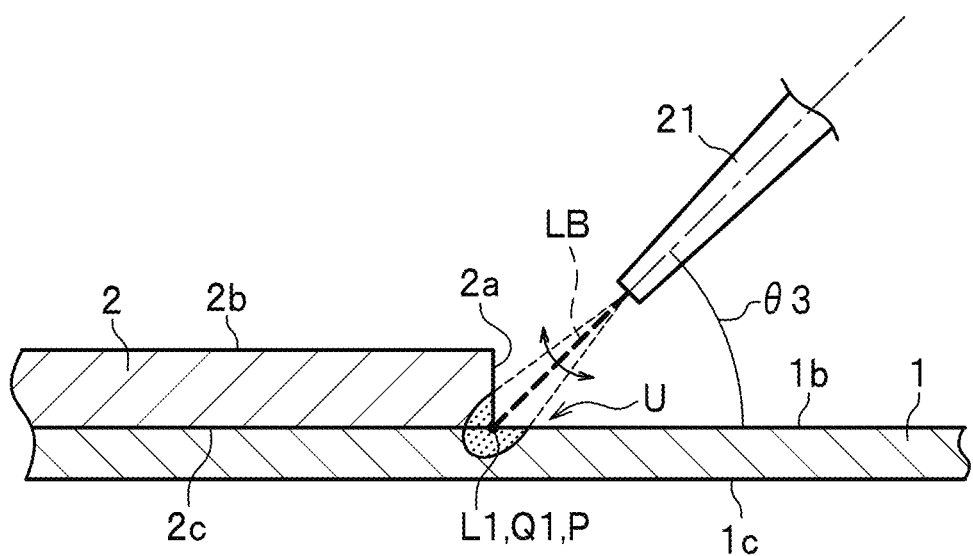
FIG. 3 is a cross-sectional view of a scene of laser welding in the welding step of the joining method according to the present embodiment.

As shown in FIG. 2, a travel angle $\theta 1$ of a shaft of the laser head 21 is set to 10°, for example. The travel angle is a tilt angle of the shaft of the laser head 21 with respect to the vertical axis, in a side view of the hybrid welding machine 10 with respect to a welding direction. The travel angle $\theta 1$ may be set properly in a range of −10° to 10° with respect to the vertical axis. As shown in FIG. 3, a work angle $\theta 3$ of the shaft of the laser head 21 is set to 45°, for example. The work angle $\theta 3$ is an opening angle from the front surface 1b of the first metal member 1 to the shaft of the laser head 21, as viewed in the welding direction. The work angle θ3 may be properly set in a range of 30-60°.

Figure 4:
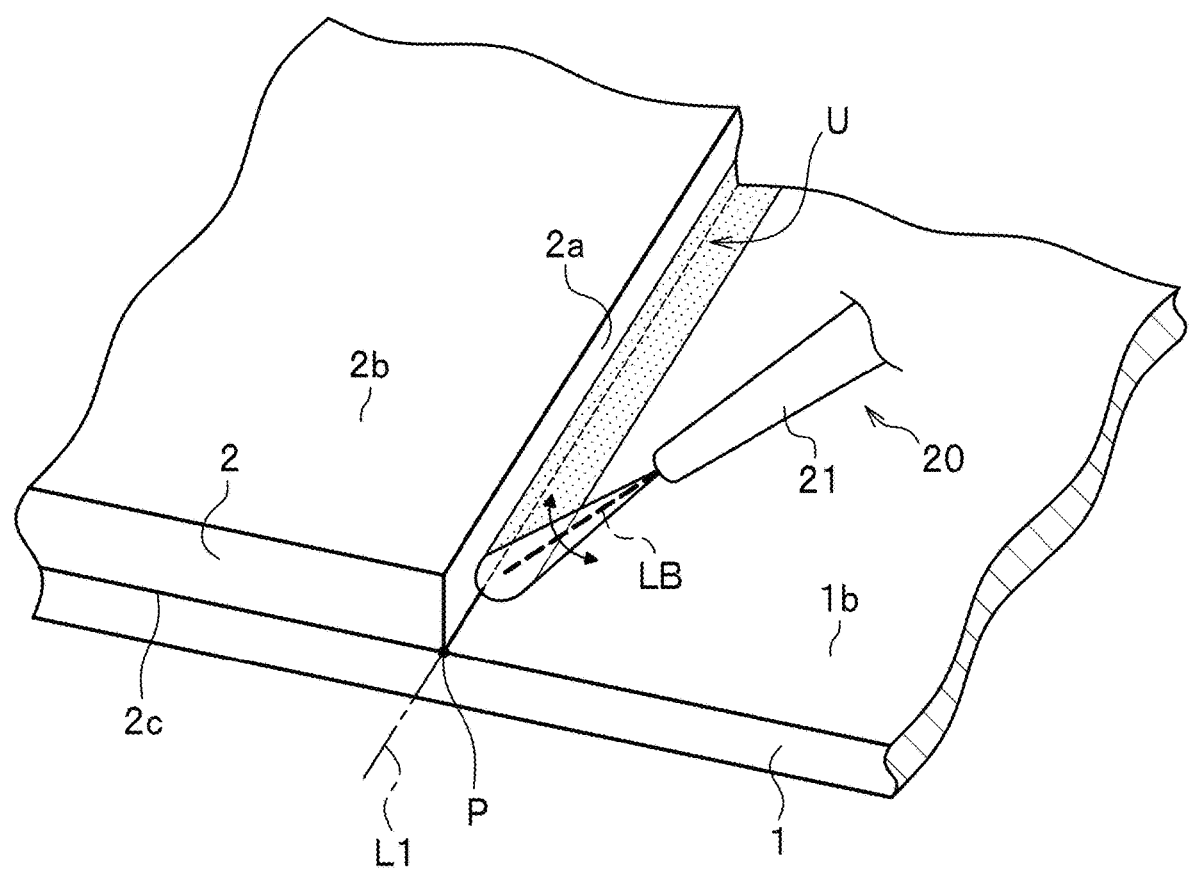
FIG. 4 is a perspective view of a scene of oscillation of the laser welding in the welding step of the joining method according to the present embodiment.

As shown in FIG. 4, in the welding step, the laser beam LB is oscillated for welding. Note that the MIG welding unit 30 is omitted in FIG. 4 for the purpose of illustration. In the welding step, the laser beam LB is oscillated to cross the preset travel route L1 while the laser welding unit 20 is traveled along the preset travel route L1. That is, the center of oscillation of the laser beam LB (welded position Q1: FIG. 3) is set on the preset travel route L1 while the laser welding unit 20 is traveled along the preset travel route L1. In other words, the laser beam LB is oscillated to cross a welding route by arc welding. An oscillation amplitude of the laser beam LB is properly set and may be set in a range of 0.3-10 mm, for example. The oscillation amplitude of the laser beam LB is preferably 0.5 mm or more, more preferably 0.8 mm or more, and even more preferably 1 mm or more, but preferably 5 mm or less, more preferably 4 mm or less, and even more preferably 3 mm or less. The oscillation amplitude of the laser beam LB being set equal to or more than the lower limit of the above range allows for increasing a weld width, to likely increase joint strength. The oscillation amplitude of the laser beam LB being equal to or less than the upper limit of the above range allows for limiting an area irradiated with the laser beam to an area where heat conduction by arc welding is transferred, to secure weld penetration by the laser beam, so that joint strength is effectively improved. Note that, in the present specification, an oscillation amplitude of the laser beam LB denotes a length from one endmost position to the other endmost position of an irradiated position. Further, the oscillation amplitude of the laser beam LB denotes a length in a plane orthogonal to the central axis of oscillation of the laser beam LB. Still further, a frequency may be in a range of 250-800 Hz, preferably in a range of 270-700 Hz. Yet further, it is preferable to set power of the laser beam LB to a level that a keyhole KH (see FIG. 7) by laser welding is formed in the first metal member 1.

Note that, in the present embodiment, the laser beam LB is made to linearly reciprocate with respect to the preset travel route L1, to oscillate in zigzag in the welding direction, but is not limited thereto. For example, the laser beam LB may be oscillated to trace a wave, a circle, an elliptic, a polygon, or a combination of these, so as to cross the preset travel route L1.

Figure 5:
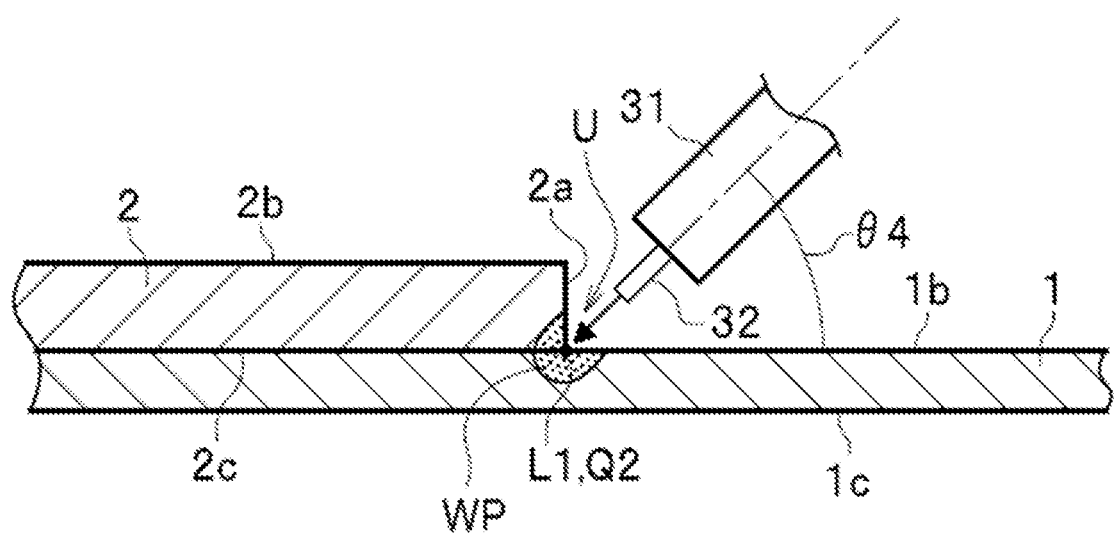
FIG. 5 is a cross-sectional view of a scene of MIG welding in the welding step of the joining method according to the present embodiment.

As shown in FIG. 2, a travel angle θ2 of a shaft of the arc torch 31 is set to 30°, for example. The travel angle θ2 may be set properly in a range of 10°-50°. As shown in FIG. 5, a work angle θ4 of the shaft of the arc torch 31 is set to 45°, for example. The work angle θ4 is an opening angle from the front surface 1*b* of the first metal member 1 to the shaft of the arc torch 31, as viewed in the welding direction. The work angle θ4 may be set properly in a range of 30-80°. A welded position Q2 by the MIG arc 33 (see FIG. 7) generated from the arc torch 31 is set on the preset travel route L1.

In the welding step, as shown in FIG. 3, laser welding is performed by the laser beam LB radiated from the leading laser head 21. The welded position Q1 by the laser beam LB is set on the preset travel route L1 and welding is performed while the laser beam LB is oscillated so as to cross the preset travel route L1. The laser beam LB is oscillated so that the vicinity of the corner P melts widely, as compared with a case where the laser beam LB is not oscillated.

Figure 6:
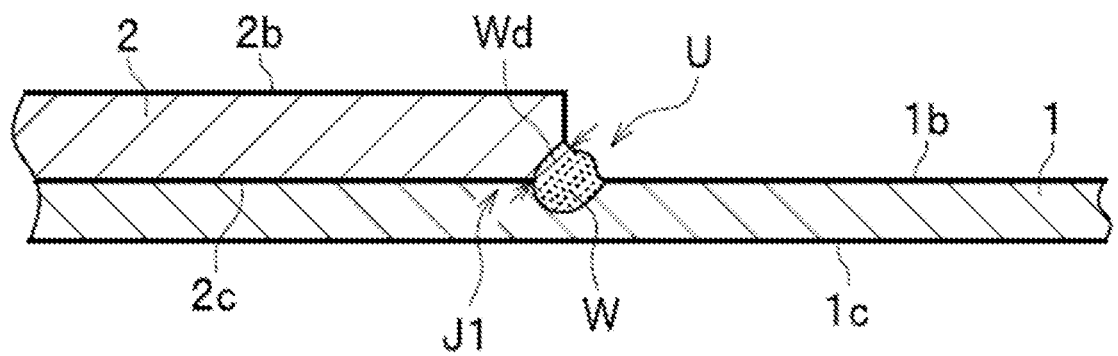
FIG. 6 is a cross-sectional view of a scene after the welding step of the joining method according to the present embodiment.
Figure 7:
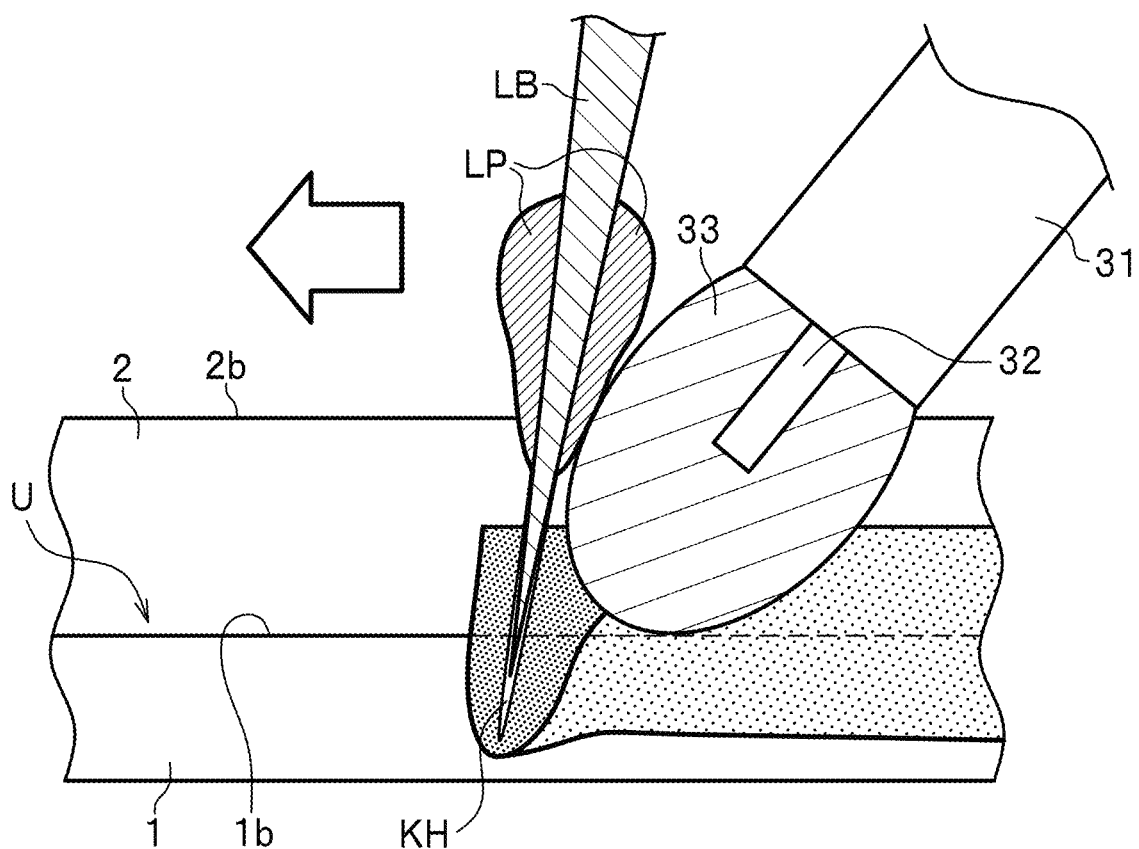
FIG. 7 is a schematic view of a scene in the welding step of the joining method according to the present embodiment, as viewed from a side.

In the welding step, as shown in FIG. 5, MIG welding is performed by the arc torch 31 trailing the laser head 21. The welded position Q2 by the arc torch 31 is set to overlap the preset travel route L1. A distance between the welded position Q1 and the welded position Q2 may be properly set within a range of 0-5 mm, for example. As shown in FIG. 7, the trailing MIG arc 33 is guided to a cathode spot (laser-induced plasma LP generated at a portion, closer to a distal end, of the laser beam LB) generated by laser welding. A weld pool WP (see FIG. 5) formed by the MIG arc 33 is merged with a melt portion by the laser beam LB, to form a weld metal (weld bead) W in the inner corner portion U, as shown in FIG. 6.

In the welding step, a welding speed may be set properly to a condition in which the inner corner portion can be welded, and is preferably set in a range of 2-10 m/min. The welding speed is more preferably set to 3 m/min or more, even more preferably 4 m/min or more, but more preferably 8 m/min or less, even more preferably 6 m/min or less. The welding speed being set equal to or more than the lower limit of the above range allows for performing the welding at a high speed, to have even a welded object, having a long welding length, welded in a short time. The welding speed being equal to or less than the upper limit of the above range allows for obtaining a sufficient throat thickness of the weld metal W, to easily suppress a decrease in joint strength.

In the welding step, the throat thickness Wd (best seen in FIG. 6) of the weld metal W formed in the inner corner portion U may be properly set in accordance with plate thicknesses of the first metal member 1 and second metal member 2 such that sufficient joint strength can be obtained by the weld metal W formed in the inner corner portion U. The throat thickness is preferably 1 mm or more, more preferably 1.5 mm or more, even more preferably 1.8 mm or more, and especially preferably 2.0 mm or more, but preferably 5 mm or less, more preferably 4 mm or less, even more preferably 3 mm or less, and especially preferably 2.5 mm or more. The throat thickness of the weld metal W being set equal to or more than the lower limit of the above range allows for likely improving the joint strength. In the present specification, the throat thickness means a thickness (actual throat thickness) of a portion, in a cross section orthogonal to the welding direction, of the weld metal W where a length from a root portion to a top surface of the weld metal W is minimal.

Figure 13:
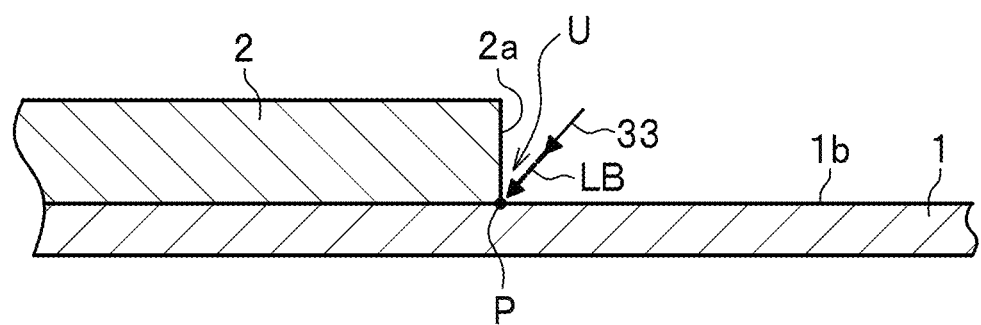
FIG. 13 is a schematic cross-sectional view of a scene of conventional hybrid welding.

Here, according to conventional hybrid welding, when a welding speed is relatively low, both advantages of an increased weld width by arc welding and a deep penetration depth by laser welding can be combined. However, when a welding speed is increased, disadvantages are created such that a weld width by arc welding becomes narrow, and an area irradiated with the leading laser beam is small to have a small penetration width in the vicinity of the corner P, resulting in a small weld metal. That is, in the conventional hybrid welding for an inner corner portion as shown in FIG. 13, a throat thickness of a weld metal is decreased to have joint strength decreased when a welding speed is high. Further, an amount of the weld metal is reduced to have a problem that the robustness to allowance for a gap between metal members and misalignment of a welded position.

In contrast, according to the joining method of the present embodiment, the laser beam LB is oscillated to cross the preset travel route L1 while the laser welding unit 20 is traveled along the preset travel route L1, to increase a penetration width around the corner P. Accordingly, metal around the corner P melted by the leading laser beam LB turns into weld metal by the trailing MIG welding, so that the weld metal W in the inner corner portion U can be increased in cooperation with the filler material 32, and a throat thickness can be increased. As a result, a welding speed is increased and joint strength is maintained without being decreased. Further, the laser beam LB being oscillated allows for increasing the weld metal W and robustness to allowance for a gap between metal members or misalignment of a welded position.

Further, as in the welding step of the present embodiment, the distance between the welded position Q1 by the leading laser beam LB and the welded position Q2 by the trailing MIG arc 33 is preferably set in a range of 0-5 mm. The distance between the welded position Q1 and the welded position Q2 being set equal to or greater than the lower limit of the above range allows for preventing arc welding from leading laser welding, and for maintaining the distance between the laser head 21 and the arc torch 31 to facilitate joining. Still further, the distance between the welded position Q1 and the welded position Q2 being set equal to or less than the upper limit of the above range allows the cathode spot of laser welding to suitably guide the MIG arc 33. Accordingly, welding is performed at a high speed without causing the weld bead (weld metal W) to be meandered.

Further, in the overlapping step, the gap between the front surface 1b of the first metal member 1 and the back surface 2c of the second metal member 2 is preferably set in a range of 0-1 mm. If the gap exceeds 1 mm, the joint strength may decrease.

Working Examples

Next, a description is given of working examples according to the present invention. Here, the first metal member 1 was joined with the second metal member 2 with use of the hybrid welding machine 10, to obtain test pieces each having a lap joint. Further, a tensile test piece and a cross-sectional observation test piece were prepared from each test piece to perform a joint strength test (tensile test) on the lap joint and to observe a macroscopic cross-section thereof. In the comparative examples, hybrid welding was performed without oscillating the laser beam LB, and, in the working examples, hybrid welding was performed by oscillating the laser beam LB as in the embodiment described above.

In both the comparative examples and working examples, an aluminum alloy A5052 was used as the first metal member 1, having a thickness t of 2 mm, a width of 150 mm, and a length of 300 mm. In both the comparative examples and working examples, an aluminum alloy A6061 was used as the second metal member 2, having a thickness t of 3 mm, a width of 150 mm, and a length of 300 mm. An overlapped margin between the first metal member 1 and second metal member 2 was set to 60 mm in a width direction. The first metal member 1 and second metal member 2 overlapped with each other, were welded together to prepare a test piece, and then, a rectangular-shaped tensile test piece in a planar view, having a total length of 240 mm in a direction orthogonal to the preset travel route L1 in a planar view of the test piece and a width of 20 mm, was cut out for the tensile test. Further, a rectangular-shaped cross-sectional observation test piece in a planar view, having a total length of 45 mm including a length of 15 mm extending from the corner P toward the second metal member 2 and a length of 30 mm extending from the corner P away from the second metal member 2, and a width of 20 mm, was cut out for cross-sectional observation.

As shown in FIG. 8, welding speeds in the comparative examples and working examples were set at 5 (m/min). Laser power was set to 2.5 (kw) in the comparative examples and was set to 4.5 (kw) in the working examples. Welding current of MIG arc was set to 228 (A) in the comparative examples and was set to 230 (A) in the working examples. Oscillation amplitude of the laser beam LB was set to 3.2 mm, and a frequency was set to 335 Hz in the working examples.

Further, as shown in FIG. 8, the travel angle θ1 of the laser head 21 was set to 10°, and the travel angle θ2 of the arc torch 31 was set to 30° in both the comparative examples and working examples. In the comparative examples and working examples, the work angle θ3 of the laser head 21 was set to 45°, and the work angle θ4 of the MIG arc 33 was set to 45°. Other conditions are as shown in FIG. 8.

In the comparative examples and working examples, the preset travel route was set at the corner P of the inner corner portion U formed by the front surface 1b of the first metal member 1 and the end surface 2a of the second metal member 2 intersecting with each other, and the preset travel route was set at a position offset from the corner P. In other words, the welded position Q1 of the laser beam LB and the welded position Q2 of the MIG arc 33 were offset in a direction orthogonal to the corner P (positions X1, X2, X3) to check joining conditions under each condition. Specifically, as shown in FIG. 1, the position X1 was set to a position on the preset travel route L1 (offset distance=0). The position X2 was set to a position away from the preset travel route L1 by +0.5 mm (0.5 mm toward the second metal member 2). The position X3 was set to a position away from the preset travel route L1 by −0.5 mm (0.5 mm away from the second metal member 2).

Further, in the comparative examples and working examples, the gap between the first metal member 1 and second metal member 2 was set in three cases of 0 mm, 0.5 mm, and 1.0 mm for the above-mentioned offset distances (−0.5 mm, 0 mm, 0.5 mm). Accordingly, test pieces NO. 1 to 9 were obtained in the comparative examples, and test pieces NO. 10 to 18 were obtained in the working examples.

Further, in both the comparative examples and working examples, a tensile test, in which each tensile test piece was held at both of two end positions in the width direction and pulled in directions away from each other, was performed to measure the maximum test force F (N). Further, for the weld metal W contained in each tensile test piece, a length LL (mm) of a welded part, which is a length in the width direction (welding direction) of the tensile test piece, was measured. Then, joint strength was calculated using the following Formula (1), and an average in two tests of the joint strength obtained from the tensile test pieces was taken. Such a case was evaluated as "good" where the joint strength exceeded 200 N/mm and the throat thickness (actual throat thickness) exceeded 1.5 mm.

Joint strength (N/mm)=Maximum test force $F$ (N)/ Length $LL$ (m) of a welded part     Formula (1)

Further, in both the comparative examples and working examples, each cross-sectional observation test piece was polished with emery paper and etched with Tucker's solution, and then a cross-section thereof was observed with use of an optical microscope.

By the cross-section observation, the throat thickness of the weld metal W formed at the inner corner portion U was measured. The throat thickness of the weld metal W was obtained by measuring a thickness of a portion where a length from the root portion to the top surface of the weld metal W was minimal. Specifically, a throat thickness of the weld metal W was set to be a smaller one of a thickness of a portion (first smallest throat thickness) which has a minimal length from an intersection, which is closer to the second metal member 2, between intersections of a lower part of the weld metal W and the front surface 1b of the first metal member 1, and a thickness of a portion (second smallest throat thickness) which has a minimal length from an intersection between the lower part of the weld metal W and the back surface 2c of the second metal member 2.

Figure 9:
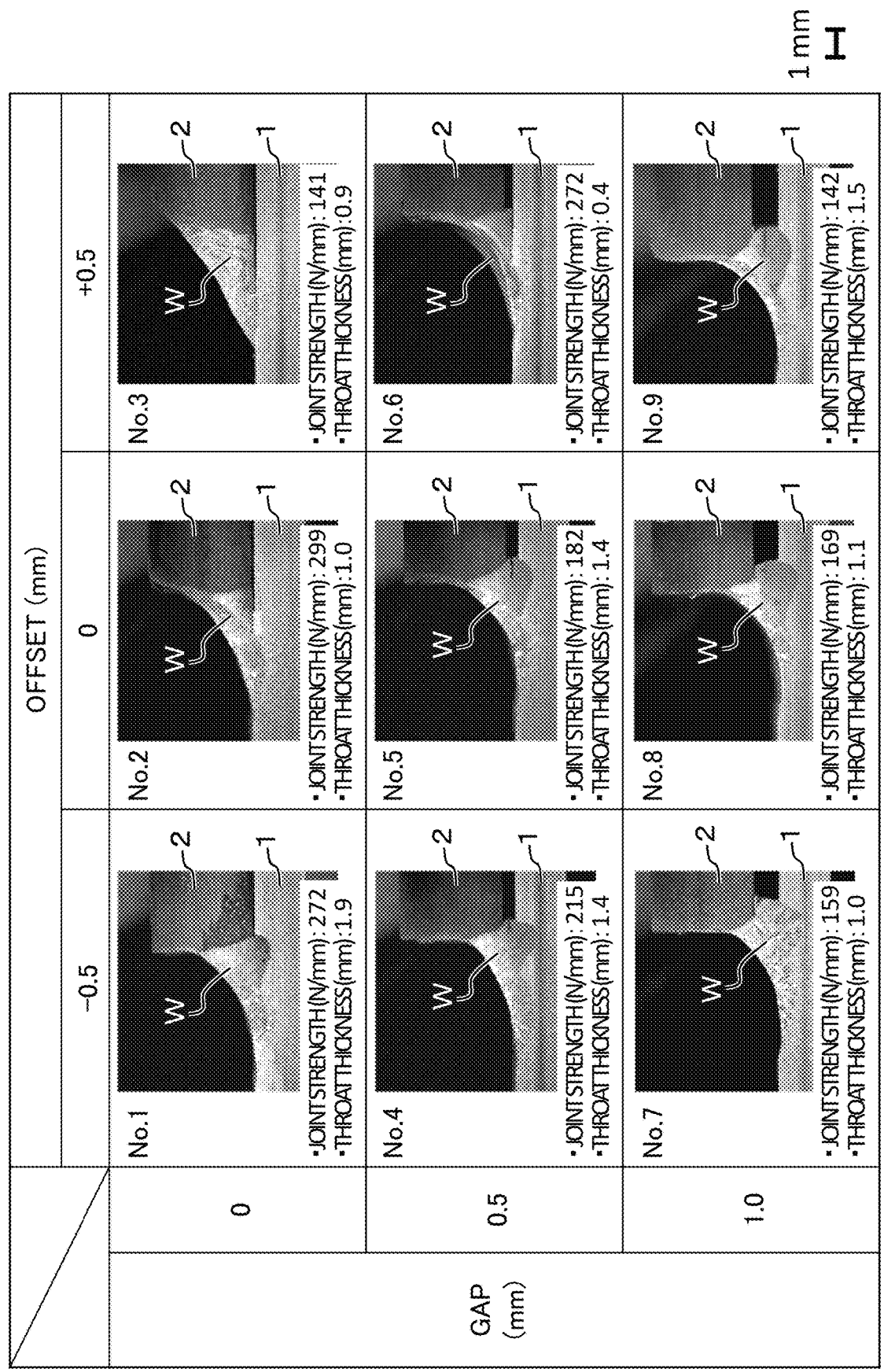
FIG. 9 is a chart showing an experimental result of the comparative example in the joint strength test, with a macroscopic cross-section of each test piece.

As shown in FIG. 9, it was found that the weld metal W in the comparative examples is likely reduced in thickness so as to be concave toward the inner corner portion U. In contrast, as shown in FIG. 10, it was found that the weld metal W in the working examples is likely formed to be convex in a direction away from the inner corner portion U.

Figure 10:
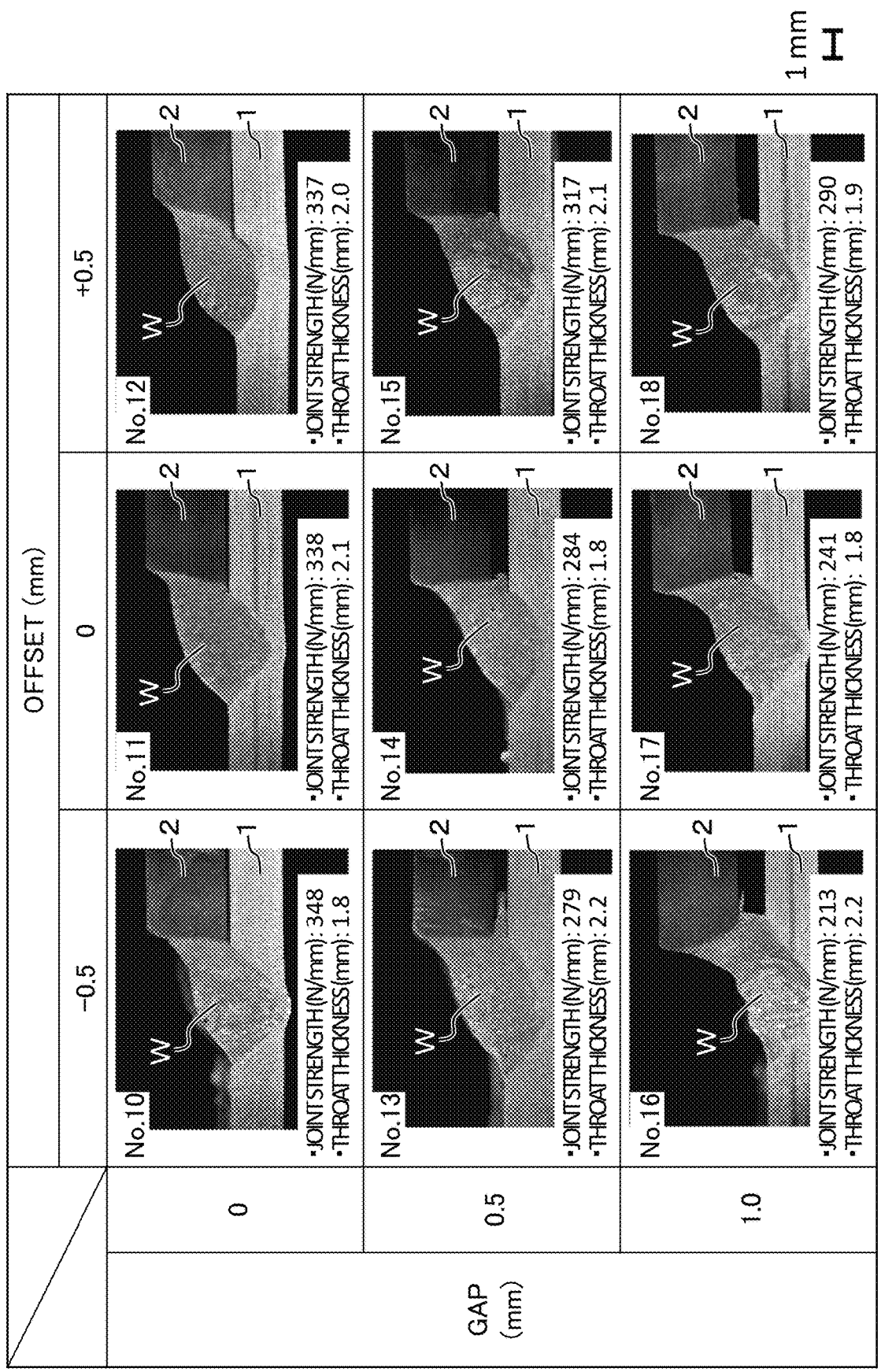
FIG. 10 is a chart showing an experimental result of the working example in the joint strength test, with a macroscopic cross-section of each test piece.

Further, as shown in FIGS. 9 and 10, it was found that the throat thicknesses in the working examples are generally larger than those in the comparative examples. Specifically, the throat thicknesses in the comparative examples were in a range of 0.9-1.9 mm, whereas the throat thicknesses in the working examples were in a range of 1.8-2.2 mm. It was found that the throat thicknesses in the working examples were larger than those in the comparative examples under the same conditions of a gap and an offset, except the test piece NO. 1.

Figure 11:
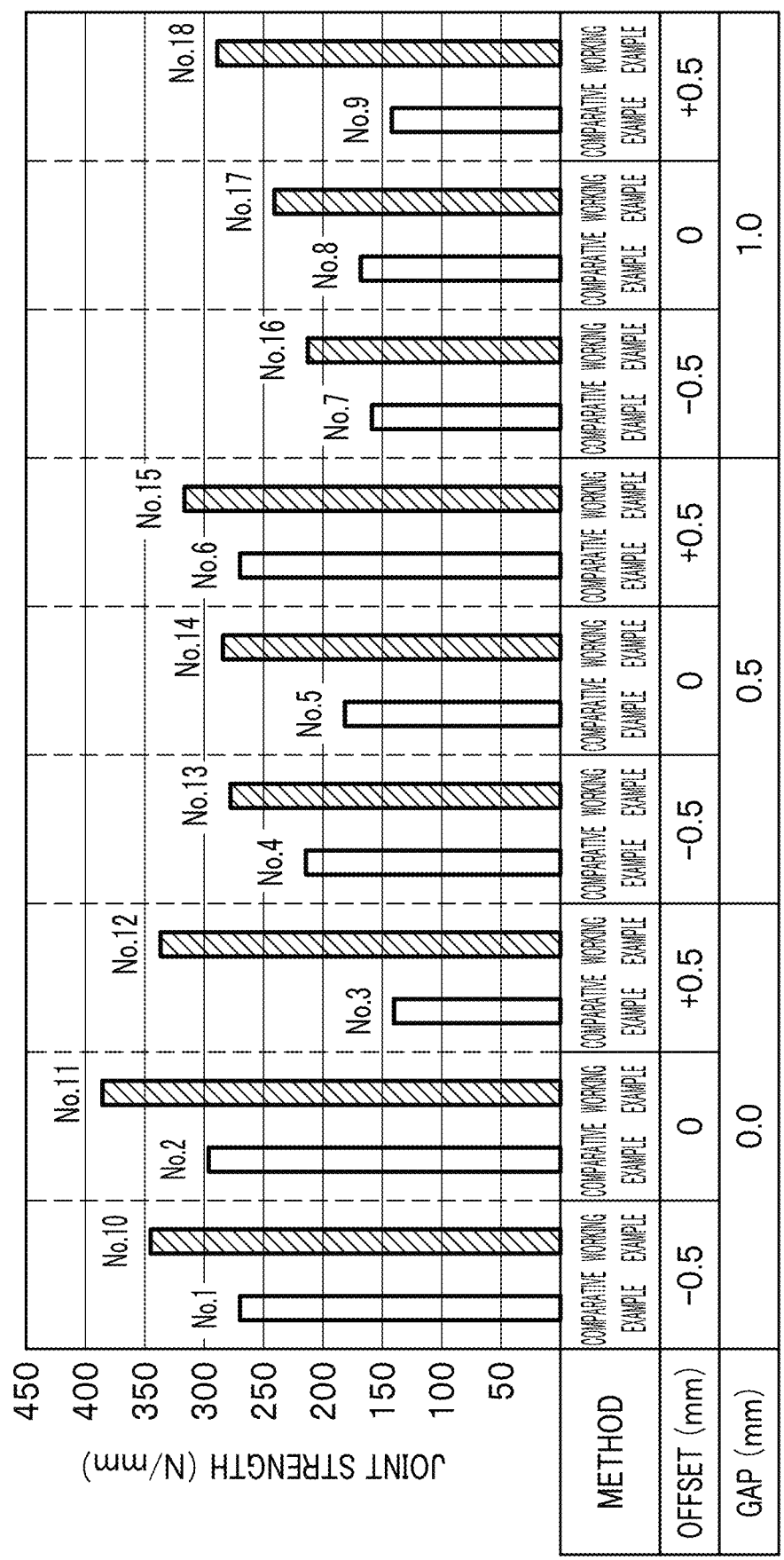
FIG. 11 is a graph showing test results in the joint strength test for each method.

Further, the joint strength in the comparative examples was in a range of 141-299 (N/mm), whereas the joint strength in the working examples was in a range of 213-348 (N/mm). As shown in FIG. 11, it was found that the joint strength in the working examples exceeded that in the comparative examples for all the test pieces under the same conditions of a gap and an offset.

Figure 12:
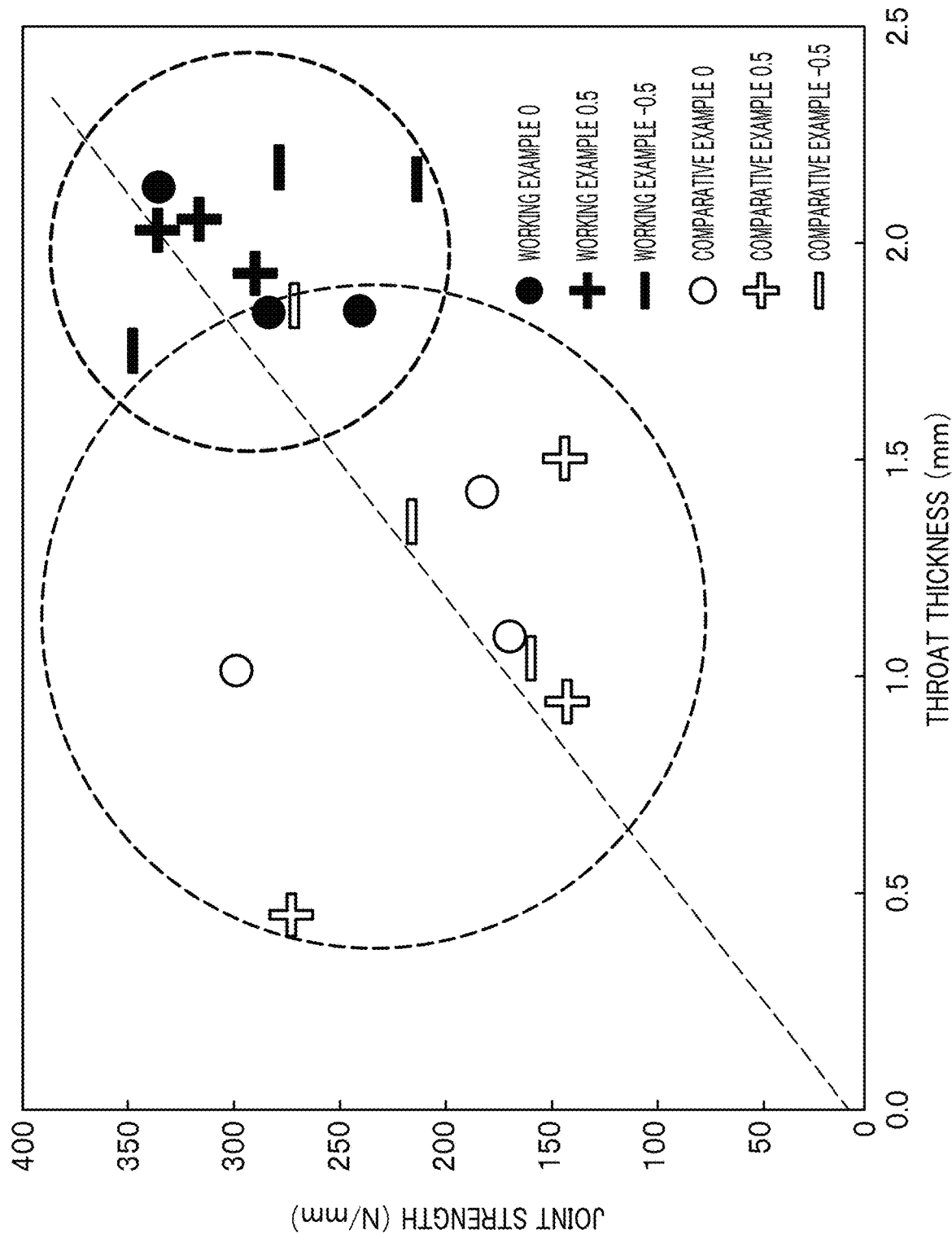
FIG. 12 is a chart showing a relationship between a throat thickness and joint strength in the joint strength test.

Further, as shown in FIG. 12, it was found that the joint strength exceeded 200 N/mm and the throat thicknesses exceeded 1.5 mm, evaluated good, for all the test pieces. In contrast, in the comparative examples, only one test piece (test piece NO. 1) met the requirements described above.

Further, as shown in FIG. 12, it was found that the joint strength and the throat thicknesses in the comparative examples (indicated with open symbols) had large variations by conditions, while the joint strength and throat thicknesses in the working examples (indicated with black symbols) had small variations by conditions, indicating that the joint quality was stable.

Further, in the working examples, it was found that the joint strength and the throat thicknesses were larger when a gap between the first metal member 1 and second metal member 2 was smaller (no gap). Still further, in the working examples, it was found that, when the gap between the first metal member 1 and second metal member 2 was 0.5 mm or 1.0 mm, the joint strength increased in the order of an offset amount of −0.5, 0, +0.5.

As described above, according to the working examples, the joint strength can be increased as compared with the comparative examples. Further, according to the working examples, the throat thickness of the weld metal W increases to allow for a higher welding speed, and the robustness to allowance for a gap between metal members and misalignment of a welded position is improved.

REFERENCE SIGNS LIST

1: first metal member; 2: second metal member; 10: hybrid welding machine; 20: laser welding unit; 21: laser head; 30: MIG welding unit; 31: arc torch; 32: filler material; 33: MIG arc; LB: laser beam; U: inner corner portion; W: weld metal; θ1: travel angle of laser head; θ2: travel angle of arc torch; θ3: work angle of laser head; θ4: work angle of arc torch

What is claimed is:

1. A joining method comprising:
an overlapping step of overlapping a front surface of a first metal member with a back surface of a second metal member; and
a welding step of welding the first metal member with the second metal member by hybrid welding, with use of a hybrid welding machine including a leading laser welding unit and a trailing arc welding unit, wherein
in the welding step, laser welding, by irradiating with a laser beam, and arc welding are performed, along a preset travel route which is set on an inner corner portion formed by the front surface of the first metal member and an end surface of the second metal member, to the inner corner portion and the laser beam is oscillated to cross the preset travel route, and
the preset travel route is set in a range of equal to or more than −0.5 mm and less than 0 mm at a position offset away from the second metal member with respect to a corner in a direction orthogonal to the end surface with respect to the corner wherein the front surface of the first metal member intersects with the end surface of the second metal member, while being oriented parallel to the end surface of the second metal member.

2. The joining method according to claim 1, wherein a gap between the first metal member and the second metal member is set in a range of 0-1 mm.

3. The joining method according to claim 1, wherein a throat thickness of weld metal formed at the inner corner portion with the welding step is set in a range of 1-5 mm.

4. The joining method according to claim 1, wherein the first metal member is made of aluminum or an aluminum alloy, and
the second metal member is made of aluminum or an aluminum alloy.

* * * * *